United States Patent
Guo et al.

(10) Patent No.: US 11,549,169 B2
(45) Date of Patent: Jan. 10, 2023

(54) METHOD FOR FABRICATING THERMAL BARRIER COATING HAVING SELF-REPAIR AND TEMPERATURE-SENSITIVE FUNCTIONS

(71) Applicant: AECC BEIJING INSTITUTE OF AERONAUTICAL MATERIALS, Beijing (CN)

(72) Inventors: Mengqiu Guo, Beijing (CN); Haoliang Tian, Beijing (CN); Changliang Wang, Beijing (CN); Zhihui Tang, Beijing (CN); Yang Yu, Beijing (CN); Yongjing Cui, Beijing (CN); Junguo Gao, Beijing (CN); Zimin Zhou, Beijing (CN); Tianying Wang, Beijing (CN); Ang Zhang, Beijing (CN)

(73) Assignee: AECC BEIJING INSTITUTE OF AERONAUTICAL MATERIALS, Beijing (CN)

( * ) Notice: Subject to any disclaimer, the term of this patent is extended or adjusted under 35 U.S.C. 154(b) by 0 days.

(21) Appl. No.: 17/420,626

(22) PCT Filed: Jun. 17, 2020

(86) PCT No.: PCT/CN2020/000142
§ 371 (c)(1),
(2) Date: Jul. 2, 2021

(87) PCT Pub. No.: WO2021/012629
PCT Pub. Date: Jan. 28, 2021

(65) Prior Publication Data
US 2022/0106675 A1    Apr. 7, 2022

(30) Foreign Application Priority Data
Jul. 22, 2019   (CN) .......................... 201910661266.3

(51) Int. Cl.
| | |
|---|---|
| *C23C 4/129* | (2016.01) |
| *C23C 4/126* | (2016.01) |
| *C23C 4/134* | (2016.01) |
| *C23C 4/08* | (2016.01) |
| *C23C 4/10* | (2016.01) |
| *B22F 1/00* | (2022.01) |
| *B22F 3/10* | (2006.01) |
| *B22F 1/05* | (2022.01) |

(52) U.S. Cl.
CPC ............. *C23C 4/129* (2016.01); *B22F 1/09* (2022.01); *B22F 3/1007* (2013.01); *C23C 4/08* (2013.01); *C23C 4/10* (2013.01); *C23C 4/126* (2016.01); *C23C 4/134* (2016.01); *B22F 1/05* (2022.01); *B22F 2201/20* (2013.01)

(58) Field of Classification Search
CPC .. C23C 4/129; C23C 4/08; C23C 4/10; C23C 4/126; C23C 4/134; C23C 1/0433; C23C 4/11; C23C 19/058; C23C 4/06; B22F 1/09; B22F 3/1007; B22F 1/05; B22F 2201/20; B22F 2003/242; B22F 2998/10
See application file for complete search history.

(56) References Cited

U.S. PATENT DOCUMENTS

| | | | | |
|---|---|---|---|---|
| 5,320,909 A | * | 6/1994 | Scharman | ............. F02F 7/0087 |
| | | | | 428/615 |
| 2010/0330282 A1 | * | 12/2010 | Nienburg | ................ C23C 24/08 |
| | | | | 427/292 |
| 2013/0095340 A1 | * | 4/2013 | Sivakumar | .............. C23C 28/36 |
| | | | | 977/890 |

FOREIGN PATENT DOCUMENTS

| | | | | | |
|---|---|---|---|---|---|
| CN | 102719778 | A | * | 10/2012 | |
| CN | 102719778 | A | | 10/2012 | |
| CN | 103074533 | A | * | 5/2013 | |
| CN | 104451525 | A | | 3/2015 | |
| CN | 106119765 | A | | 11/2016 | |
| CN | 108060384 | A | * | 5/2018 | ............. C22C 19/03 |
| CN | 108060384 | A | | 5/2018 | |
| CN | 108588627 | A | | 9/2018 | |
| CN | 110484854 | A | | 11/2019 | |
| KR | 20180076523 | A | | 7/2018 | |

OTHER PUBLICATIONS

International Search Report issued in International Application No. PCT/CN2020/000142 dated Sep. 22, 2020 (3 pages).
Written Opinion issued in International Application No. PCT/CN2020/000142 dated Sep. 22, 2020 (6 pages).

* cited by examiner

*Primary Examiner* — Dah-Wei D. Yuan
*Assistant Examiner* — Nga Leung V Law
(74) *Attorney, Agent, or Firm* — Osha Bergman Watanabe & Burton LLP

(57) ABSTRACT

A method for preparing a thermal barrier coating (TBC) material includes: spraying a metal mixture onto a surface of an alloy using supersonic flame spraying or explosive spraying to form a bottom layer; spraying an yttria-stabilized zirconia (YSZ) precursor sol onto the bottom layer using liquid plasma spraying to form an intermediate layer; and spraying a ceramic composite including $SiO_2$ and La—Ce—Zr—O using plasma spraying or explosive spraying to form a surface layer.

8 Claims, No Drawings

METHOD FOR FABRICATING THERMAL BARRIER COATING HAVING SELF-REPAIR AND TEMPERATURE-SENSITIVE FUNCTIONS

TECHNICAL FIELD

The present disclosure relates to temperature detection and self-repairing thermal barrier coating (TBC) materials for aeroengine blade protection; specifically relates to a preparation method for thermal barrier coatings with self-repairing and temperature-sensitive functions.

BACKGROUND

As a protective coating in gas turbine hot end components, thermal barrier coatings (TBCs) can greatly improve the service life and service temperature of gas turbines. However, in a constant high-temperature environment, the bonding strength between the ceramic layer and the substrate decreases, which leads to the gradual peeling of the ceramic layer. Therefore, we need a new adhesive layer that does not only slow down the development of thermal stress between the ceramic layer and the matrix at high temperatures but also has robust high-temperature stability and can increase the bonding strength between the matrix and the ceramic layer. As a new kind of high-performance alloy, high-entropy alloys have excellent microstructural stabilities at high temperatures. The high-temperature stabilities of high-entropy alloys and high-temperature-resistant oxides with bonding properties that form at high temperatures can be used to improve the high-temperature resistance of the bonding layer and the bonding strength between the ceramic layer and matrix.

In addition, the service life of TBCs depends largely on the temperature change, and the surface temperature (TS) is much higher than the substrate interface temperature (TB). The temperature difference along the coating thickness direction (TS TB) is an important factor leading to vertical cracks and interface peeling in TBCs. However, it is difficult to measure the internal temperature of the coating accurately. At present, the temperature measurement technologies used in high-temperature environments mainly include temperature-indicating paint, infrared temperature measurements and thermocouple temperature measurements. Temperature-indicating paint is a kind of temperature-sensitive coating that is applied on a given part surface. This paint shows a certain color within a specific temperature range to indicate the surface temperature and temperature distribution across the part. However, the accuracy of this paint-based method is not desirable, the error is more than ±50° C., and the temperature measurement limit is less than 800° C.; therefore, it is not suitable for the high-temperature environments in which thermal barrier coatings are used. Infrared temperature measurement technology is a type of non-contact temperature measurement that is suitable for a wide range of temperature measurements, does not interfere with the temperature field of the measured object, and has a fast reaction rate. However, infrared measurements are easily affected by external factors, such as the emissivity of the object, the measurement distance, smoke and dust, and the measurement error is large, especially in high-temperature environments. Thermocouple is a kind of contact temperature measurement method that utilizes the thermoelectric effect. Although this operation is simple and the corresponding measurement accuracy is high, the temperature measuring element must contact the measured medium to achieve thermal balance over a certain period of time to achieve a temperature measurement. Therefore, this method includes a delay phenomenon, and it cannot monitor the internal temperature of the coating. In summary, the current temperature measurement methods are not competent for this work. In recent years, fluorescence temperature measurement technology based on the temperature characteristics of optical material responses has developed rapidly. By doping rare earth fluorescent elements into a thermal barrier coating, the spectral width, fluorescence intensity and fluorescence lifetime of the fluorescent material change correspondingly when the thermal barrier coating is applied at different temperatures. Therefore, the correlation between the temperature and the spectrum width, fluorescence intensity and fluorescence lifetime can be studied, and the service temperature of the thermal barrier coating can be determined for the purpose of real-time monitoring. Accordingly, the present disclosure uses liquid plasma spraying technology to prepare a rare-earth-ion temperature-sensitive thermal barrier coating doped with Co, and the mapping relationship between the luminescent properties of the rare earth element and the temperature can be used to monitor the changing trends in the internal temperature of the coating in real time. Different contents of rare earth fluorescent tracer ions are doped into each TBC layer. Then, the coupling relationship between the TBC and the temperature is studied after application of the TBC in a high-temperature environment to realize real-time monitoring of the service temperature for the entire thickness of the TBC.

In recent years, research on self-repairing technologies with biological-like properties has gradually attracted attention, and the study of materials with bionic structures has become a new research direction within the field of self-healing materials. The development of high-temperature sweating semiactive heat-resistant materials and the preparation of polymer self-healing materials containing microcapsules or hollow fiber tubes and capillary-like structures are trending research directions. Therefore, using self-healing anti-thermal materials for aerospace vehicles is desired.

Therefore, since the cracks caused by thermal stress are difficult to accurately locate and repair in real time, the present disclosure refers to the concept of imitating the self-healing repair of human cells. Moreover, $SiO_2$ repair agent microcapsules are compounded in a La—Ce—Zr—O coating. When the coating cracks, the microcapsules are broken due to the effect of stress, the repair agent is released, and the oxidation products are generated under high-temperature conditions. The self-repairing function can be realized by filling a certain amount of these coating cracks.

SUMMARY

One or more embodiments of the present disclosure provide a design and preparation method for intelligent self-repairing temperature-sensitive thermal barrier coating materials.

One or more embodiments of the present disclosure provide a method for preparing a thermal barrier coating (TBC) with self-repair and temperature-sensitive functions, which comprises the following steps:

Step 1: A mixed-metal sintering material is prepared, an yttria-stabilized zirconia YSZ precursor sol is prepared, and $SiO_2$ mixed La—Ce—Zr—O ceramic composites are prepared.

Step 2: The mixed-metal sintering material is sprayed onto the surface of an alloy using a supersonic flame spraying or explosive spraying process to form the bottom layer. Then, yttria-stabilized zirconia YSZ precursor sol is sprayed onto the surface of the bottom layer through a liquid plasma spraying process to form the intermediate layer. Finally, $SiO_2$ is mixed with the La—Ce—Zr—O ceramic composite either through a plasma spraying process or explosive spraying process. The material is sprayed onto the surface of the intermediate layer to form a surface layer.

By adjusting the ratio of oxygen/acetylene/propane, the gun stacking rate and the spraying distance, the implementation of the explosive spraying process can ensure that the bottom layer of Ni—Co—Fe—Cr—Si—Al—Ti alloy has a high content of high-entropy components. Additionally, the utilization of this process can also ensure that the loss of $SiO_2$ microcapsules in the surface layer of $SiO_2$ La—Ce—Zr—O ceramic composite is minimized, increasing the high-entropy effect. Such process also utilizes the excellent high-temperature oxidation resistance and strain-impact resistance of the bottom layer of the alloy, as well as the self-healing function of $SiO_2$ microcapsules in the La—Ce—Zr—O ceramic surface layer.

In some embodiments, the mixed-metal sintering material in step 1 is powder, and the ceramic composite $SiO_2$ material that is mixed with La—Ce—Zr—O is a powder.

In some embodiments, the sintering preparation method for the mixed-metal material comprises the following steps:

Step 1: Ni powder, Co powder, Fe powder, Cr powder, Si powder, Al powder and Ti powder with particle sizes of 0.5~1 μm are selected. The mass percentage ratio of Ni powder, Co powder, Fe powder, Cr powder, Si powder, Al powder and Ti powder is (82~84): (6~7): (1~2): (2~3): (0.1~0.5): (2~3): (0.5~6.9), and all the powders are mixed uniformly to obtain a Ni—Co—Fe—Cr—Si—Al—Ti powder.

Step 2: Polyvinyl alcohol powder is added to the mixed powder obtained in step 1. The mass ratio of polyvinyl alcohol powder in the mixed powder is 7-10%. Then, the mixed powder is heated and stirred to obtain a mixed liquid material.

Step 3: The mixture obtained in step 2 is made into a bottom-layer powder by a vacuum atomization process, and the particle size of the bottom-layer powder is 30 μm~40 μm.

Step 4: The bottom-layer powder is sintered at high temperature in a vacuum-sintering furnace to induce sintering reactions between the metal elements in the bottom-layer powder and obtain a mixed-metal sintering material.

In some embodiments, the mixed-metal sintering material is ground and screened to obtain a metal-sintering mixed powder with a uniform particle size (for example, 30-45 μm).

In some embodiments, the mixed powder obtained in step 1 is ball milled and mixed in a liquid medium (alcohol) at a rotating speed of 7~10 RPM for 20~25 hours; then, the Ni—Co—Fe—Cr—Si—Al—Ti mixed powder is obtained by an ultrasonic treatment at a frequency of 20~25 Hz for 0.5~1 hour and a drying treatment at 50~60° C. for 0.5~1 hour.

In some embodiments, in the second step of the sintering preparation method for the mixed-metal material, the heating temperature is 30-60° C., the stirring time is 30-60 min, and the stirring rate is 300-500 RPM. Spray-mixed granulation of the mixture is carried out in vacuum, and a Ni—Co—Fe—Cr—Si—Al—Ti composite spraying material with a particle size of 30 μm~40 μm is obtained.

In some embodiments, in step 4 of the sintering preparation method for the above mixed-metal material, the sintering treatment causes a solid solution reaction of Ni, Al, Fe, Cr and Co.

In some embodiments, for the vacuum-sintering process in step 4 of the above sintering preparation method for mixed-metal materials, the vacuum degree is $1\times10^{-3}$ Pa, the heating temperature is 810~830° C., the heating rate is 10~15° C./min, and the protective gas is hydrogen.

According to one or more embodiments of the present disclosure, a preparation method for the yttria-stabilized zirconia YSZ precursor sol comprises the following steps:

Step 1: $Er_2O_3$ and hydrochloric acid (volume concentration 98%) are evenly mixed to obtain the first mixed solution, in which the mass ratio of $Er_2O_3$ and hydrochloric acid is (33~37): (63~67).

Step 2: $ZrOCl_2 \cdot 8H_2O$ octahydrate, $Y_2O_3$ and deionized water are evenly mixed at a mass percentage ratio of 28-30:1:69-71 to obtain the second mixed solution.

Step 3: Ammonia water with pH=10 is prepared and gradually dropped into both the first mixed solution and the second mixed solution as the reaction bottom solution. During mixing, the first mixed solution and the second mixed solution are heated at the same time to obtain an $Er^{3+}$ yttria-stabilized zirconia YSZ precursor sol with pH=3~6.

In some embodiments, in step 1 of the preparation method for yttria-stabilized zirconia YSZ precursor sol, 2~5 g polyethylene glycol dispersant is added, the stirring speed is 400 RPM, and the stirring time is 30~50 min.

In some embodiments, in step 2 of the preparation method for yttria-stabilized zirconia YSZ precursor sol, the mixing time is 60-90 min, the stirring speed is 500 RPM, and 30-50 g of polyethylene glycol dispersant is added.

In some embodiments, the heating temperature in step 3 of the preparation method for the yttria-stabilized zirconia YSZ precursor sol is 80° C., and the uniform stirring time is 12~15 hours.

According to one or more embodiments of the present disclosure, a method for preparing the $SiO_2$ mixed $La_2Zr_2O_7$ ceramic composite comprises the following steps:

Step 1: Styrene liquid and sodium hydroxide solution with mass fractions of 5-7% are uniformly mixed under stirring, and the lower-layer solution is obtained after sufficient reaction and static stratification. The lower-layer solution is gradually added into the trimethylammonium chloride solution to obtain a mixed trimethylammonium chloride and styrene solution. An aqueous solution of azodiisobutylamine hydrochloride is added into the mixed trimethylammonium chloride and styrene solution. The styrene microsphere emulsion is obtained by polymerization. The styrene microsphere emulsion, hexadecyl trimethyl ammonium bromide powder and ammonia water are mixed evenly, tetraethyl orthosilicate is gradually added to induce a reaction, and a mixed solution containing $SiO_2$ is obtained.

$La_2O_3$ powder, $CeO_2$ powder and hydrochloric acid are mixed at a mass ratio of 23~28:5~8:64~72 to obtain a $La_2Ce_2O_7$ mixed solution after a homogeneous and sufficient reaction.

Zirconia octahydrate is mixed with deionized water to obtain an aqueous zirconia solution.

Step 2: The $SiO_2$ mixture, $La_2Ce_2O_7$ mixed solution and zirconia aqueous solution are mixed evenly, ammonia water is gradually added, and the mixture fully reacts to produce the mixed emulsion of pH=3~6 $SiO_2$ and La—Ce—Zr—O.

Step 3: Centrifugal sedimentation of the mixed emulsion is carried out, and the precipitates are obtained, filtered, cleaned and dried. The dried settlement is calcined at a calcination temperature of 530~580° C., and the ceramic composite material is obtained.

In some embodiments, the ceramic composite material is ground and screened to obtain ceramic composite powder with a uniform particle size (for example, 30-40 μm) of $SiO_2$ mixed with La—Ce—Zr—O.

In some embodiments, in step 1 of the preparation method for the abovementioned $SiO_2$ mixed $La_2Zr_2O_7$ ceramic composite, styrene liquid and sodium hydroxide solution with mass fractions of 5-7% are stirred evenly, and isoprene is formed in the reaction.

In some embodiments, in step 1 of the preparation method for the $SiO_2$ mixed $La_2Zr_2O_7$ ceramic composite, the gradual addition decreases.

In some embodiments, in step 1 of the preparation method for the abovementioned $SiO_2$ mixed $La_2Zr_2O_7$ ceramic composite material, the aqueous solution of the azo two isobutyl amiate hydrochloride is added into the mixed trimethylamine chloride and styrene solution to induce a polymerization and obtain a styrene microsphere emulsion.

In some embodiments, the ceramic composite material is used to form a surface layer, and the surface layer has a self-repairing function.

In some embodiments, the preparation steps for the above $SiO_2$ mixed $La_2Zr_2O_7$ ceramic composites are as follows: the aqueous solution of azo two isobutyl amiate hydrochloride is added into the mixed trimethylamine chloride and styrene solution to polymerize the styrene microsphere emulsion, the condensing system is obtained in the polymerization process, and $N_2$ is used as a protective gas.

One or more embodiments of the present disclosure may have advantages as follows.

1. The present disclosure is a kind of thermal barrier coating with self-healing and temperature-sensitive functions; it includes a three-layer structure, which effectively overcomes the insufficient toughness problem of a traditional thermal barrier coating, which can only provide single-layer protection. According to the different thermal shock strengths of engine turbine blades, the strength of this material can be adjusted intelligently and adaptively. Such coating materials can have the properties of heat insulation, corrosion resistance and erosion resistance, effectively extending the service life of the coating.
2. The high-entropy alloy in the Ni—Co—Fe—Cr—Si—Al—Ti system is used as the bonding underlayer, fully realizing the excellent high-temperature stability of the high-entropy alloy. Through the coupling adaptive protection mechanism, the thermal stress between the ceramic layer and the substrate at high temperatures is reduced, providing the motivation for a new high-performance thermal barrier coating design.
3. Yttria-stabilized zirconia YSZ with $Er^{3+}$ is used as the intermediate layer, and the correlation between the $Er^{3+}$ fluorescence intensity and the temperature is used to monitor the TBC service temperature. By studying the "fluorescence intensity service temperature fluorescence life" coupling mapping relationship, the high-temperature service health status and residual life of TBCs can be accurately evaluated.
4. The ceramic surface of $SiO_2$ is mixed with La—Ce—Zr—O to simulate the self-healing concept of human cell rupture, and the self-healing of the thermal barrier coating cracking is realized based on $SiO_2$ microcapsules.

DETAILED DESCRIPTION

One or more embodiments of the present disclosure will be described clearly and completely. Clearly, the described embodiments represent only a portion of the embodiments of the invention, not all of them. Based on the embodiments in the invention, all other embodiments obtained by ordinary technicians in the field without creating the work belong to the protection scope of the invention.

EXAMPLE 1

A method for preparing a thermal barrier coating with self-repair and temperature-sensitive functions is provided, comprising the following steps:

Step 1: A mixed-metal sintering material is prepared, an yttria-stabilized zirconia YSZ precursor sol is prepared, and $SiO_2$ mixed La—Ce—Zr—O ceramic composites are prepared.

Step 2: The mixed-metal sintering material is sprayed onto the surface using a supersonic flame spraying or explosive spraying process to form the bottom layer. Then, yttria-stabilized zirconia YSZ precursor sol is sprayed onto the surface of the bottom layer through a liquid plasma spraying process to form the intermediate layer. Finally, $SiO_2$ is mixed with a La—Ce—Zr—O ceramic composite either through a plasma spraying process or explosive spraying process. The material is sprayed onto the surface of the intermediate layer to form a surface layer.

In some embodiments, the mixed-metal sintering material in step 1 is powder, and the ceramic composite $SiO_2$ material that is mixed with La—Ce—Zr—O is powder.

The sintering preparation method for the mixed-metal material comprises the following steps:

Step 1: Ni powder, Co powder, Fe powder, Cr powder, Si powder, Al powder and Ti powder with particle sizes of 0.5 μm are selected. The mass percentage ratio of Ni powder, Co powder, Fe powder, Cr powder, Si powder, Al powder and Ti powder is 82:6:1:2:0.1:2:6.9, and the powders are mixed evenly to obtain a Ni—Co—Fe—Cr—Si—Al—Ti mixed powder.

Step 2: Polyvinyl alcohol powder is added to the to the mixed powder obtained in step 1. The mass ratio of polyvinyl alcohol powder in the mixed powder is 7-10%. Then, the mixed powder is heated and stirred to obtain a mixed liquid material.

Step 3: The mixture obtained in step 2 is made into a bottom-layer powder by a vacuum atomization process, and the particle size of the bottom-layer powder is 30 μm.

Step 4: The bottom-layer powder is sintered at high temperature in a vacuum-sintering furnace to induce sintering reactions between the metal elements in the bottom-layer powder to obtain a mixed-metal sintering material.

In some embodiments, the mixed-metal sintering material is ground and screened to obtain a metal-sintering mixed powder with a uniform particle size (for example, 30 μm).

In some embodiments, the mixed powder obtained in step 1 is ball milled and mixed in a liquid medium (alcohol) at a rotating speed of 7 RPM for 20 hours. Then, the mixed Ni—Co—Fe—Cr—Si—Al—Ti powder is obtained by an ultrasonic treatment at a frequency of 20 Hz for 0.5 hours and a drying treatment at 50° C. for 0.5 hours.

In some embodiments, in the second step of the sintering preparation method for the mixed-metal material, the heating temperature is 30° C., the stirring time is 30 min, and the stirring rate is 300 RPM. A spray-mixed granulation liquid mixture procedure is carried out in vacuum, and a Ni—Co—

Fe—Cr—Si—Al—Ti composite spraying material with a particle size of 30 μm is obtained.

In some embodiments, in step 4 of the sintering preparation method for the above mixed-metal material, the sintering treatment causes a solid solution reaction of Ni, Al, Fe, Cr and Co.

In some embodiments, for the vacuum-sintering process in step 4 of the above method for preparing the mixed-metal material, the vacuum pressure is $1\times10^{-3}$ Pa, the heating temperature is 810° C., the heating rate is 10° C./min, and the protective gas is hydrogen.

The preparation method for yttria-stabilized zirconia YSZ precursor sol comprises the following steps:

Step 1: $Er_2O_3$ and hydrochloric acid (volume concentration 98%) are evenly mixed to obtain the first mixed solution, in which the mass ratio of $Er_2O_3$ and hydrochloric acid is 33:67.

Step 2: The mass percentage ratio of $ZrOCl_2 \cdot 8H_2O$ octahydrate, $Y_2O_3$ and deionized water is 28:1:71, and the second mixed solution is obtained upon mixing these components.

Step 3: Ammonia water with pH=10 is prepared and gradually dropped into both the first mixed solution and the second mixed solution as the reaction bottom solution. During mixing, the first mixed solution and the second mixed solution are heated to obtain an $Er^{3+}$ yttria-stabilized zirconia YSZ precursor solution at pH=3.

In some embodiments, in step 1 of the preparation method for the yttria-stabilized zirconia YSZ precursor sol, 2 g of polyethylene glycol dispersant is added, the stirring is uniform at a rate of 400 RPM, and the stirring time is 30 min.

In some embodiments, in step 2 of the preparation method for the yttria-stabilized zirconia YSZ precursor sol, the mixing time is 60 min, the stirring speed is 500 RPM, and 30 g of polyethylene glycol dispersant is added.

In some embodiments, the heating temperature of step 3 of the preparation method for the yttria-stabilized zirconia YSZ precursor sol is 80° C., and the uniform stirring time is 12 hours.

The method for preparing the $SiO_2$ mixed $La_2Zr_2O_7$ ceramic composite comprises the following steps:

Step 1: Styrene liquid and 5% sodium hydroxide solution are evenly stirred together to obtain the lower solution after sufficient reaction and static stratification. The lower solution is gradually added into the trimethylammonium chloride solution to obtain the mixed trimethylammonium chloride and styrene solution. Then, an aqueous solution of azodiisobutylamine hydrochloride is added into the mixed trimethylammonium chloride and styrene solution. The styrene microsphere emulsion is obtained by polymerization. The styrene microsphere emulsion, hexadecyl trimethyl ammonium bromide powder and ammonia water are mixed evenly, tetraethyl orthosilicate is gradually added to induce a reaction, and a mixed solution containing $SiO_2$ is obtained.

$La_2O_3$ powder, $CeO_2$ powder and hydrochloric acid are mixed at a mass ratio of 23:5:72, and a $La_2Ce_2O_7$ mixed solution is obtained after a homogeneous and sufficient reaction.

Zirconia octahydrate is mixed with deionized water to obtain an aqueous zirconia solution. Step 2: The $SiO_2$ mixture, $La_2Ce_2O_7$ mixed solution and zirconia aqueous solution are mixed evenly, ammonia water is gradually added, and the mixture fully reacts to produce the mixed emulsion of pH=3 $SiO_2$ and La—Ce—Zr—O.

Step 3: Centrifugal sedimentation of the mixed emulsion is carried out, and the precipitates are obtained, filtered, cleaned and dried. At a calcination temperature of 530° C., the ceramic composite is obtained by calcining the dried settlement.

In some embodiments, the ceramic composite material is ground and screened to obtain ceramic composite powder with a uniform particle size (for example, 30 μm) of $SiO_2$ mixed with La—Ce—Zr—O.

In some embodiments, in step 1 of the above method for preparing the $SiO_2$ mixed $La_2Zr_2O_7$ ceramic composite, styrene liquid and 5% sodium hydroxide solution are stirred evenly, and isoprene is formed in the reaction.

In some embodiments, in step 1 of the preparation method for the $SiO_2$ mixed $La_2Zr_2O_7$ ceramic composite, the gradual addition decreases.

In some embodiments, in step 1 of the preparation method for the abovementioned $SiO_2$ mixed $La_2Zr_2O_7$ ceramic composite material, the aqueous solution of the azo two isobutyl amiate hydrochloride is added into the mixed trimethylamine chloride and styrene solution to induce a polymerization and obtain a styrene microsphere emulsion.

In some embodiments, the ceramic composite material is used to form a surface layer, and the surface layer has a self-repairing function.

In some embodiments, the preparation steps for the above $SiO_2$ mixed $La_2Zr_2O_7$ ceramic composites are as follows: the aqueous solution of azo two isobutyl amiate hydrochloride is added into the mixed trimethylamine chloride and styrene solution to polymerize the styrene microsphere emulsion, the condensing system is obtained in the polymerization process, and nitrogen gas is used as a protective gas.

EXAMPLE 2

One or more embodiments of the present disclosure are described as follows:

Step 1: Mixed metal sintering materials are prepared, an yttria-stabilized zirconia YSZ precursor sol is prepared, and $SiO_2$ mixed La—Ce—Zr—O ceramic composites are prepared.

Step 2: The metal sintering mixture is sprayed onto the surface using a supersonic flame spraying or explosive spraying process to form the bottom layer. Then, yttria-stabilized zirconia YSZ precursor sol is sprayed onto the surface of the bottom layer through a liquid plasma spraying process to form the intermediate layer. Finally, $SiO_2$ is mixed with a La—Ce—Zr—O ceramic composite either through a plasma spraying process or explosive spraying process. The material is sprayed onto the surface of the intermediate layer to form a surface layer.

Furthermore, the mixed-metal sintering material in step 1 is powder, and the ceramic composite $SiO_2$ material that is mixed with La—Ce—Zr—O is powder.

The sintering preparation method for the mixed-metal material comprises the following steps:

Step 1: Ni powder, Co powder, Fe powder, Cr powder, Si powder, Al powder and Ti powder with particle sizes of 0.7 μm are selected. The mass percentage ratio of Ni powder, Co powder, Fe powder, Cr powder, Si powder, Al powder and Ti powder is 83:6:1:2:0.3:2:5.7, and the powders are evenly mixed to obtain a Ni—Co—Fe—Cr—Si—Al—Ti mixed powder.

Step 2: Polyvinyl alcohol powder is added to the to the mixed powder obtained in step 1. The mass ratio of polyvinyl alcohol powder in the mixed powder is 8%, and then the mixed powder is heated and stirred to obtain a mixed liquid material.

Step 3: The mixture obtained in step 2 is made into a bottom-layer powder by a vacuum atomization process, and the particle size of the bottom-layer powder is 35 µm.

Step 4: The bottom-layer powder is sintered at high temperature in a vacuum-sintering furnace to induce sintering reactions between the metal elements in the bottom-layer powder and obtain a mixed-metal sintering material.

In some embodiments, the mixed-metal sintering material is ground and screened to obtain a metal-sintering mixed powder with a uniform particle size (for example, 40 µm).

In some embodiments, the mixed powder obtained in step 1 is ball milled and mixed in a liquid medium (alcohol) at 8 RPM for 23 hours. Then, the mixed Ni—Co—Fe—Cr—Si—Al—Ti powder is obtained by an ultrasonic treatment at 23 Hz for 0.8 hours and a drying treatment at 50° C. for 0.5 hours.

In some embodiments, in the second step of the sintering preparation method for the mixed-metal material, the heating temperature is 50° C., the stirring time is 50 min, and the stirring rate is 400 RPM. A spray-mixed granulation liquid mixture procedure is carried out in vacuum, and a Ni—Co—Fe—Cr—Si—Al—Ti composite spraying material with a particle size of 35 µm is obtained.

In some embodiments, in step 4 of the sintering preparation method for the above mixed-metal material, the sintering treatment causes a solid solution reaction of Ni, Al, Fe, Cr and Co.

In some embodiments, for the vacuum-sintering process in step 4 of the above method for preparing the mixed-metal material, the vacuum pressure is $1\times10^{-3}$ Pa, the heating temperature is 820° C., the heating rate is 13° C./min, and the protective gas is hydrogen.

The preparation method for yttria-stabilized zirconia YSZ precursor sol comprises the following steps:

Step 1: Er2O3 and hydrochloric acid (volume concentration 98%) are evenly mixed to obtain the first mixed solution, in which the mass ratio of Er2O3 and hydrochloric acid is 35:65.

Step 2: ZrOCl2·8H2O octahydrate, Y2O3 and deionized water are evenly mixed at a mass percentage ratio of 29:1:70 to obtain the second mixed solution.

Step 3: Ammonia water with pH=10 is prepared and gradually dropped into both the first mixed solution and the second mixed solution as the reaction bottom solution. During mixing, the first reaction solution and the second mixed solution are heated at the same time to obtain an $Er^{3+}$ yttria-stabilized zirconia YSZ precursor sol with pH=3~6.

In some embodiments, in step 1 of the above preparation method for yttria-stabilized zirconia YSZ precursor sol, 4 g of polyethylene glycol dispersant is added, the stirring is uniform at a rate of 400 RPM, and the stirring time is 40 min.

In some embodiments, in step 2 of the preparation method for the yttria-stabilized zirconia YSZ precursor sol, the mixing time is 80 min, the stirring speed is 500 RPM, and 40 g of polyethylene glycol dispersant is added.

In some embodiments, the heating temperature in step 3 of the preparation method for the yttria-stabilized zirconia YSZ precursor sol is 80° C., and the uniform stirring time is 14 hours.

The method for preparing the $SiO_2$ mixed $La_2Zr_2O_7$ ceramic composite comprises the following steps:

Step 1: Styrene liquid and 6% sodium hydroxide solution are evenly stirred together to obtain the lower solution after sufficient reaction and static stratification. The lower solution is gradually added into the trimethylammonium chloride solution to obtain the mixed trimethylammonium chloride and styrene solution. Then, an aqueous solution of azodiisobutylamine hydrochloride is added into the mixed trimethylammonium chloride and styrene solution. The styrene microsphere emulsion is obtained by polymerization. The styrene microsphere emulsion, hexadecyl trimethyl ammonium bromide powder and ammonia water are mixed evenly, tetraethyl orthosilicate is gradually added to induce a reaction, and a mixed solution containing $SiO_2$ is obtained.

$La_2O_3$ powder, $CeO_2$ powder and hydrochloric acid are mixed at a mass ratio of 26:7:67, and a $La_2Ce_2O_7$ mixed solution is obtained after a homogeneous and sufficient reaction.

Zirconia octahydrate is mixed with deionized water to obtain an aqueous zirconia solution.

Step 2: The $SiO_2$ mixture, $La_2Ce_2O_7$ mixed solution and zirconia aqueous solution are mixed evenly, ammonia water is gradually added, and the mixture fully reacts to produce the mixed emulsion of pH=5 $SiO_2$ and La—Ce—Zr—O.

Step 3: Centrifugal sedimentation of the mixed emulsion is carried out, and the precipitates are obtained, filtered, cleaned and dried. At a calcination temperature of 550° C., the ceramic composite is obtained by calcining the dried settlement.

In some embodiments, the ceramic composite material is ground and screened to obtain a ceramic composite powder with a uniform particle size (for example, 35 µm) of $SiO_2$ mixed with La—Ce—Zr—O.

In some embodiments, in step 1 of the above preparation method for the $SiO_2$ mixed $La_2Zr_2O_7$ ceramic composite, styrene liquid and 6% sodium hydroxide solution are stirred evenly, and isoprene is formed in the reaction.

In some embodiments, in step 1 of the preparation method for the $SiO_2$ mixed $La_2Zr_2O_7$ ceramic composite, the gradual addition decreases.

In some embodiments, in step 1 of the preparation method for the abovementioned $SiO_2$ mixed $La_2Zr_2O_7$ ceramic composite material, the aqueous solution of the azo two isobutyl amiate hydrochloride is added into the mixed trimethylamine chloride and styrene solution to induce a polymerization and obtain a styrene microsphere emulsion.

In some embodiments, the ceramic composite material is used to form a surface layer, and the surface layer has a self-repairing function.

In some embodiments, the preparation steps of the above $SiO_2$ mixed $La_2Zr_2O_7$ ceramic composites are as follows: the aqueous solution of azo two isobutyl amiate hydrochloride is added into the mixed trimethylamine chloride and styrene solution to polymerize the styrene microsphere emulsion, the condensing system is obtained in the polymerization process, and nitrogen gas is used as a protective gas.

EXAMPLE 3

One or more embodiments of the present disclosure are described as follows:

Step 1: Mixed-metal sintering materials are prepared, an yttria-stabilized zirconia YSZ precursor sol is prepared, and $SiO_2$ mixed La—Ce—Zr—O ceramic composites are prepared.

Step 2: The metal sintering mixture is sprayed onto the surface using a supersonic flame spraying or explosive spraying process to form the bottom layer. Then, yttria-stabilized zirconia YSZ precursor sol is sprayed onto the surface of the bottom layer through a liquid plasma spraying process to form the intermediate layer. Finally, $SiO_2$ is mixed with a La—Ce—Zr—O ceramic composite either through a plasma spraying process or explosive spraying process. The material is sprayed onto the surface of the intermediate layer to form a surface layer.

In some embodiments, the mixed-metal sintering material in step 1 is powder, and the ceramic composite $SiO_2$ material that is mixed with La—Ce—Zr—O is powder.

The sintering preparation method for the mixed-metal material comprises the following steps:

Step 1: Ni powder, Co powder, Fe powder, Cr powder, Si powder, Al powder and Ti powder with particle sizes of 1 μm are selected. The mass percentage ratio of Ni powder, Co powder, Fe powder, Cr powder, Si powder, Al powder and Ti powder is 84:7:2:3:0.5:3:0.5, and the powders are mixed evenly to obtain a Ni—Co—Fe—Cr—Si—Al—Ti mixed powder.

Step 2: Polyvinyl alcohol powder is added to the to the mixed powder obtained in step 1. The mass ratio of polyvinyl alcohol powder in the mixed powder is 7-10%. Then, the mixed powder is heated and stirred to obtain the mixed liquid material.

Step 3: The mixture obtained in step 2 is made into a bottom-layer powder by a vacuum atomization process, and the particle size of the bottom-layer powder is 40 μm.

Step 4: The bottom-layer powder is sintered at high temperature in a vacuum-sintering furnace to induce sintering reactions between the metal elements in the bottom-layer powder and obtain a mixed-metal sintering material.

In some embodiments, the mixed-metal sintering material is ground and screened to obtain a uniform (e.g., 45 μm) metal sintering mixed powder.

In some embodiments, the mixed powder obtained in step 1 is ball milled and mixed in a liquid medium (alcohol) at a rotating speed of 10 RPM for 25 hours. Then, the mixed Ni—Co—Fe—Cr—Si—Al—Ti powder is obtained by an ultrasonic treatment at a frequency of 25 Hz for 1 hour and a drying treatment at 60° C. for 1 hour.

In some embodiments, in the second step of the sintering preparation method for the mixed-metal material, the heating temperature is 60° C., the stirring time is 60 min, and the stirring rate is 500 RPM. A spray-mixed granulation liquid mixture procedure is carried out in vacuum, and a Ni—Co—Fe—Cr—Si—Al—Ti composite spraying material with a particle size of 40 μm is obtained.

In some embodiments, in step 4 of the sintering preparation method for the above mixed-metal material, the sintering treatment causes a solid solution reaction of Ni, Al, Fe, Cr and Co.

In some embodiments, for the vacuum-sintering process in step 4 of the above sintering preparation method for mixed-metal materials, the vacuum pressure is $1 \times 10^{-3}$ Pa, the heating temperature is 830° C., the heating rate is 15° C./min, and the protective gas is hydrogen.

The preparation method for yttria-stabilized zirconia YSZ precursor sol comprises the following steps:

Step 1: $Er_2O_3$ and hydrochloric acid (volume concentration 98%) are evenly mixed to obtain the first mixed solution, in which the mass ratio of $Er_2O_3$ and hydrochloric acid is 37:67.

Step 2: Zirconia octahydrate $ZrOCl_2 \cdot 8H_2O$, yttrium oxide $Y_2O_3$ and deionized water are evenly mixed at a mass percentage ratio of 30:1:69 to obtain the second mixed solution.

Step 3: Ammonia water with pH=10 is prepared and gradually dropped into both the first mixed solution and the second mixed solution as the reaction bottom solution. During mixing, the first mixed solution and the second mixed solution are heated at the same time to obtain an Er3+yttria-stabilized zirconia YSZ precursor solution with pH=6.

In some embodiments, in step 1 of the above preparation method for yttria-stabilized zirconia YSZ precursor sol, 5 g of polyethylene glycol dispersant is added and stirred evenly at 400 RPM for 50 min.

In some embodiments, in step 2 of the preparation method for the yttria-stabilized zirconia YSZ precursor sol, the mixing time is 90 min, the stirring speed is 500 RPM, and 50 g of polyethylene glycol dispersant is added.

In some embodiments, the heating temperature of step 3 of the preparation method for the yttria-stabilized zirconia YSZ precursor sol is 80° C., and the uniform stirring time is 15 hours.

The method for preparing the $SiO2$ mixed $La2Zr2O7$ ceramic composite comprises the following steps:

Step 1: Styrene liquid and 7% sodium hydroxide solution are evenly stirred together to obtain the lower solution after sufficient reaction and static stratification. The lower solution is gradually added into the trimethylammonium chloride solution to obtain the mixed trimethylammonium chloride and styrene solution. Then, an aqueous solution of azodiisobutylamine hydrochloride is added into the mixed trimethylammonium chloride and styrene solution. The styrene microsphere emulsion is obtained by polymerization. The styrene microsphere emulsion, hexadecyl trimethyl ammonium bromide powder and ammonia water are mixed evenly, tetraethyl orthosilicate is gradually added to induce a reaction, and a mixed solution containing $SiO2$ is obtained.

$La_2O_3$ powder, $CeO_2$ powder and hydrochloric acid are mixed at a mass ratio of 28:8:64, and a $La_2Ce_2O_7$ mixed solution is obtained after a homogeneous and sufficient reaction.

Zirconia octahydrate is mixed with deionized water to obtain an aqueous zirconia solution.

Step 2: The $SiO_2$ mixture, $La_2Ce_2O_7$ mixed solution and zirconia aqueous solution are mixed evenly, ammonia water is gradually added, and the mixture fully reacts to produce the mixed emulsion of pH=6 $SiO_2$ and La—Ce—Zr—O.

Step 3: Centrifugal sedimentation of the mixed emulsion is carried out, and the precipitates are obtained, filtered, cleaned and dried. At a calcination temperature of 580° C., the ceramic composite is obtained by calcining the dried settlement.

In some embodiments, the ceramic composite material is ground and screened to obtain a ceramic composite powder with a uniform particle size (for example, 40 μm) of $SiO_2$ mixed with La—Ce—Zr—O.

In some embodiments, in step 1 of the above preparation method for the $SiO_2$ mixed $La_2Zr_2O_7$ ceramic composite, styrene liquid and 7% sodium hydroxide solution are stirred evenly, and isoprene is formed in the reaction.

In some embodiments, in step 1 of the preparation method for the $SiO_2$ mixed $La_2Zr_2O_7$ ceramic composite, the gradual addition decreases.

In some embodiments, in step 1 of the preparation method for the abovementioned $SiO_2$ mixed $La_2Zr_2O_7$ ceramic composite material, the aqueous solution of the azo two isobutyl amiate hydrochloride is added into the mixed trimethylamine chloride and styrene solution to induce a polymerization and obtain a styrene microsphere emulsion.

In some embodiments, the ceramic composite material is used to form a surface layer, and the surface layer has a self-repairing function.

In some embodiments, the preparation steps for the above $SiO_2$ mixed $La_2Zr_2O_7$ ceramic composites are as follows:

the aqueous solution of azo two isobutyl amiate hydrochloride is added into the mixed trimethylamine chloride and styrene solution to polymerize the styrene microsphere emulsion, the condensing system is obtained in the polymerization process, and nitrogen gas is used as a protective gas.

It should be understood that for those skilled in the art, improvements or transformations can be made according to the above description, and all these improvements and transformations shall fall within the protection scope of the appended claims of the invention.

The ranges of this disclosure may be expressed in the disclosure as from about one particular value, to about another particular value, or both. When such a range is expressed, it is to be understood that another embodiment is from the one particular value, to the other particular value, or both, along with all combinations within this range.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A method for preparing a thermal barrier coating (TBC) material, comprising:
   spraying a metal mixture onto a surface of an alloy using supersonic flame spraying or explosive spraying to form a bottom layer;
   spraying an yttria-stabilized zirconia (YSZ) precursor sol onto the bottom layer using liquid plasma spraying to form an intermediate layer; and
   spraying a ceramic composite including $SiO_2$ and La—Ce—Zr—O using plasma spraying or explosive spraying to form a surface layer,
   wherein the YSZ precursor sol is prepared by:
      mixing 33-37 wt % of $Er_2O_3$ and 63-67 wt % of hydrochloric acid to form a first mixed solution;
      mixing 28-30 wt % $ZrOCl_2 \cdot 8H_2O$, 1 wt % $Y_2O_3$, and 69-71 wt % deionized water to form a second mixed solution;
      gradually adding an ammonia solution having a pH of 10 into a mixture of the first mixed solution and the second mixed solution; and
      heating the mixture of the first mixed solution and the second mixed solution under stirring to form the YSZ precursor sol having a pH of 3-6.

2. The method according to claim 1, wherein the metal mixture is powder and the ceramic composite is powder.

3. The method according to claim 1, wherein the metal mixture is prepared by:
   mixing 82-84 wt % of Ni powder, 6-7 wt % of Co powder, 1-2 wt % of Fe powder, 2-3 wt % of Cr powder, 0.1-0.5 wt % of Si powder, 2-3 wt % of Al powder, and 0.5-6.9 wt % of Ti powder, each having a particle size of 0.5-1 μm, to obtain a Ni—Co—Fe—Cr—Si—Al—Ti powder;
   heating the Ni—Co—Fe—Cr—Si—Al—Ti powder with polyvinyl alcohol under stirring to obtain a mixed liquid, wherein the mixed liquid material includes 7-10% of the polyvinyl alcohol powder by weight;
   forming a bottom-layer powder having a size of 30-40 μm by vacuum atomization of the mixed liquid; and
   sintering the bottom-layer powder at a temperature in a vacuum-sintering furnace to obtain the metal mixture.

4. The method according to claim 3, wherein the sintering step is followed by grinding and screening the metal mixture to obtain a uniform particle size of 30-45 μm for the metal mixture.

5. The method according to claim 1, wherein a temperature for the heating is 80° C. and a time for the stirring is 12-15 hours.

6. The method according to claim 1, wherein the ceramic composite including $SiO_2$ and La—Ce—Zr—O is prepared by:
   obtaining a lower-layer solution from reaction of a styrene liquid and a sodium hydroxide solution having 5-7 wt % of sodium hydroxide;
   adding the lower-layer solution into a trimethylammonium chloride solution, then adding an aqueous solution of azodiisobutylamine hydrochloride to the mixture of the lower-layer solution and the trimethylammonium chloride solution to obtain a styrene microsphere emulsion;
   adding tetraethyl orthosilicate into a mixture of the styrene microsphere emulsion, hexadecyl trimethyl ammonium bromide, and an ammonia solution to obtain a SiO2 solution;
   mixing 23-28 wt % $La_2O_3$ powder, 5-8 wt % $CeO_2$ powder, and 64-72 wt % hydrochloric acid to form a $La_2Ce_2O_7$ solution;
   gradually adding the ammonia solution into the mixture of the $SiO_2$ solution, the $La_2Ce_2O_7$ solution, and a zirconia octahydrate solution to form an emulsion of $SiO_2$ and La—Ce—Zr—O having a pH of 3-6; and
   centrifuging, filtering, cleaning the emulsion of $SiO_2$ and La—Ce—Zr—O and calcining at 530-580° C. to obtain the ceramic composite including $SiO_2$ and La—Ce—Zr—O.

7. The method according to claim 6, further comprising grinding and screening the ceramic composite including $SiO_2$ and La—Ce—Zr—O to obtain a uniform particle size of 30-40 μm for the ceramic composite including $SiO_2$ and La—Ce—Zr—O.

8. A method according to claim 6, wherein the formation of the emulsion of $SiO_2$ and La—Ce—Zr—O is performed in a condensing system under nitrogen protection gas.

* * * * *